(12) United States Patent
Desai et al.

(10) Patent No.: US 7,009,835 B2
(45) Date of Patent: Mar. 7, 2006

(54) ENERGY DISSIPATIVE DEVICE AND METHOD

(75) Inventors: Shrikant Desai, Livermore, CA (US); Prabodh Shah, San Jose, CA (US); Daryl A. Cheim, San Jose, CA (US); Darshan P. Shah, San Jose, CA (US)

(73) Assignee: Olixir Technologies Corp., Milpitas, CA (US)

( * ) Notice: Subject to any disclaimer, the term of this patent is extended or adjusted under 35 U.S.C. 154(b) by 129 days.

(21) Appl. No.: 10/604,388

(22) Filed: Jul. 16, 2003

(65) Prior Publication Data

US 2005/0013107 A1    Jan. 20, 2005

(51) Int. Cl.
*G06F 1/16* (2006.01)

(52) U.S. Cl. ............... 361/683; 361/685; 248/633; 248/634; 248/638

(58) Field of Classification Search ........... 361/679, 361/683, 685; 720/693; 206/433, 521, 586, 206/521.6, 521.7, 591, 588, 594; 360/97.01–98.01; 248/638, 917; 312/223.1, 223.2; 345/905
See application file for complete search history.

(56) References Cited

U.S. PATENT DOCUMENTS

| | | | | |
|---|---|---|---|---|
| 3,346,221 A | * | 10/1967 | Farmer ............... | 267/140.13 |
| 3,384,221 A | | 5/1968 | Houtman ............... | 206/523 |
| 3,872,525 A | * | 3/1975 | Lea et al. ............... | 5/671 |
| 4,568,988 A | | 2/1986 | McGinlay et al. ....... | 360/77.02 |
| 4,638,383 A | | 1/1987 | McGinlay et al. ....... | 360/77.02 |
| 4,891,734 A | | 1/1990 | More et al. ............. | 361/807 |
| 5,041,924 A | * | 8/1991 | Blackborow et al. ..... | 360/69 |
| 5,042,024 A | * | 8/1991 | Kurosawa et al. ....... | 720/651 |
| 5,216,582 A | | 6/1993 | Russell et al. .......... | 361/685 |
| 5,402,308 A | * | 3/1995 | Koyanagi et al. ....... | 361/685 |
| 5,510,954 A | | 4/1996 | Wyler ................ | 361/685 |
| 5,546,250 A | | 8/1996 | Diel .................. | 360/97.02 |
| 5,837,934 A | | 11/1998 | Valavanis et al. ...... | 174/52.1 |
| 5,965,241 A | | 10/1999 | Mehta ................ | 428/304.4 |
| 5,995,365 A | | 11/1999 | Broder et al. .......... | 361/685 |
| 5,999,406 A | * | 12/1999 | McKain et al. ......... | 361/704 |
| 6,039,299 A | | 3/2000 | Ohnishi et al. ......... | 248/562 |
| 6,154,360 A | | 11/2000 | Kaczeus, Sr. et al. ... | 361/685 |
| 6,249,432 B1 | | 6/2001 | Gamble et al. ......... | 361/685 |
| 6,339,532 B1 | | 1/2002 | Boulay et al. ......... | 361/685 |
| 6,347,411 B1 | | 2/2002 | Darling ................ | 2/272 |
| 6,351,374 B1 | | 2/2002 | Sherry ................ | 361/685 |

(Continued)

FOREIGN PATENT DOCUMENTS

WO    WO 97/11616    *    3/1997

(Continued)

OTHER PUBLICATIONS

Mindlin R. D., "Dynamics of Package Cushioning," Bell System Technical Journal, vol. XXIV, Nos. 3-4, Jul.-Oct. 1945, AT&T, New York.

(Continued)

*Primary Examiner*—Michael Datskovskiy
(74) *Attorney, Agent, or Firm*—Kyle W. Rost

(57) ABSTRACT

An energy dissipative element protects hard disk drives from shocks and vibrations. A closed elastic envelope houses a body of open cell foam, a volume of viscous liquid, and a compressible gas. Under compression or expansion of the foam, viscous liquid flows through cell orifices and thereby dissipates energy resulting from external force applied against the elastic wall. The energy dissipative elements are applied between a disk drive housing and an outer case to create a ruggedized portable disk drive module.

15 Claims, 13 Drawing Sheets

U.S. PATENT DOCUMENTS

| | | | |
|---|---|---|---|
| 6,426,935 B1 * | 7/2002 | Imai et al. | 720/693 |
| 6,487,039 B1 * | 11/2002 | Bernett | 360/97.02 |
| 6,496,362 B1 * | 12/2002 | Osterhout et al. | 361/685 |
| 6,567,265 B1 * | 5/2003 | Yamamura et al. | 361/685 |

FOREIGN PATENT DOCUMENTS

| | | | |
|---|---|---|---|
| WO | WO 97/25551 | * | 7/1997 |
| WO | WO 99/49236 | * | 9/1999 |

OTHER PUBLICATIONS

Stevens, L.D., "Magnetic Recording Technology," IBM Journal of Research and Development, vol. 25, No. 5, Sep. 1981, pp. 677-723.

Radcliffe, C.W., "Biomechanical Design of a Lower-Extremity Prosthesis," pp. 1-15, Winter Annual Meeting, New York, New York, Nov. 27-Dec. 2, 1960, of the American Society of Mechanical Engineers, Manuscript received at ASME Headquarters, Oct. 4, 1960.

Chen, S.M. and Kumano, A., "The Efficacy of Mechanical Damper in Actuators for Rotating Disk Memory Devices," pp. 1-24, Seagate Technologies, before 1986 as internal publication of Seagate.

Lilley, D.T., "The Discussion of Some Engineering Trade-Offs in Winchester Disk Drive Isolation and Shock Protection," pp. 1-17, E-A-R Technical Report 84-14/NC, E-A-R Div/Cabot Corporation, 7911 Zionsville, Indianapolis, IN 46268, May 21, 1984.

"The Effects of Shock and Vibration on Rigid Disk Drives," by ATASI Corporation, San Jose, CA 95131, pp. 1-17, Mar. 1984.

* cited by examiner

ENERGY DISSIPATIVE DEVICE AND METHOD

BACKGROUND OF INVENTION

1. Field of the Invention

The invention generally relates to electrical systems and devices. More specifically, the invention relates to a housing or mounting assembly with diverse electrical components, especially to electronic systems and devices. The invention relates to methods and apparatus for cushioning of a computer peripheral from mechanical shocks and vibrations, especially a memory unit peripheral such as a disk drive. The method and apparatus employ highly viscous fluids that flow readily at ordinary ambient temperatures, operative in a porous elastic structure.

2. Description of Related Art including information disclosed under 37 CFR 1.97 and 1.98 The term "disk drives" may refer to any of several types of devices, including but not limited to hard disk dives, floppy disk drives, and optical disk dives such as CD and DVD drives. These disk drives share a common characteristic of having one or more rotating recording media disks, and having a transducer positioned over a surface of the media. Disk drives also share the characteristic of being highly susceptible to damage, in part due to external shock and vibration and in another part due to internally generated vibrations that are not sufficiently damped by the disk drive mounting.

A drive using fixed rotating disks inside it is called a fixed disk drive. A drive using removable disks enclosed in an envelope is called a removable media disk drive and the envelope containing the disks is called a removable disk cartridge. When the fixed disk drive itself is enclosed in an envelope and a shock resistant system is placed between them, then this assembly is called a removable drive module. A removable disk cartridge is removable from a disk drive while a removable drive module is removable from a docking device installed in a computer or an array chassis. Examples of removable disk cartridges include both industry standard floppy disk cartridges and removable hard disk cartridges. Floppy disk cartridges are supplied by many manufacturers. The 3.5-inch form factor designation does not necessarily refer to any dimension of a drive, itself. Rather, it refers to size of the disk that is designed to fit into the drive. Examples of removable disk cartridges include commercially available products supplied by companies such as Iomega, Castlewood and SyQuest. DataZone Corporation of Felton, Calif., manufactures and sells a prior art removable drive module under the trademark, DataBook. The drive module can utilize an optical disk drive, a tape drive and other such drives besides hard, magnetic disk drives.

One application of the present invention relates to removable drive module technology. In known prior art, foam, polymeric material, mechanical springs or a combination of these materials and devices provide shock and vibration protection to a disk drive. The following patents show state-of-the-art damping schemes. However, these fall short of achieving shock protection to a level reaching 7,000 Gs. The present invention overcomes this limitation.

Prior art includes U.S. Pat. No. 6,351,374 to Sherry; U.S. Pat. No. 6,249,432 to Gamble et al.; U.S. Pat. No. 6,154,360 to Kaczeus Sr. et al.; U.S. Pat. No. 5,837,934 to Valavanis et al.; U.S. Pat. Nos. 4,638,383 and 4,568,988 to McGinlay et al., and U.S. Pat. No. 3,384,221 to Houtman. These patents provide limited teachings that refer only to foam materials, which do not achieve the desired degree of protection.

U.S. Pat. No. 6,154,360 to Kaczeus, Sr., et al. is assigned to DataZone Corporation. It shows a data storage subsystem that is capable of withstanding rough handling. A data storage device such as a hard disk drive is partially surrounded by a specially configured foam enclosure, formed, for example, of polyurethane foam. In turn, the foam enclosure and disk drive are encased within a shock resistant module housing, such as one formed of high impact plastic. Within the module housing, the foam enclosure surrounds the narrow periphery of the disk drive and supports both the top and the bottom broad surfaces of the disk drive. The module housing may be slotted for ventilation.

U.S. Pat. No. 6,249,432 to Gamble et al. discloses a removable hard disk drive mounted in a carrier or tray for insertion into a docking bay. A three-component vibration damping system reduces vibration between the hard disk drive and the carrier and between the carrier and the docking bay of a computer using such drives. One component is composed of polymeric material and is located between the exterior of the carrier and the interior of the docking bay. A second component of similar polymeric material is located between the interior of the carrier and the exterior of the hard disk drive with an interference fit. The third component employs metal or polymer springs and polymeric pads located between the exterior sides of the carrier and the interior sides of the docking bay. This patent relates only to disk drives and not to general packaging and protecting of objects and systems.

U.S. Pat. No. 6,351,374 to Sherry discloses a hard disk drive module having a protective cover housing or a modular case. The module uses insulator foam or other resilient material on one side or edge of the unit so as to maintain engagement with the other side or edge of a modular case. The resilient material can reduce shock to the disk drive unit due to impact on either the case or the chassis. Even a flexible cable leading to an electrical connector is attributed with the qualities of a shock absorber. Thus, this patent teaches a degree of shock absorption, but the extent of shock absorption appears to be low.

U.S. Pat. No. 5,837,934 to Valavanis et al. presents the use of foam sheets to provide shock absorption. It neither anticipates nor suggests applications for protecting other objects, systems, or devices by use of viscous means.

U.S. Pat. Nos. 4,638,383 and 4,568,988 to McGinlay et al. provide a prior art disk drive design. These patents teach an anti-vibration mount using an elastic rubber material known as AVM 206. The capability of such a mount material is 40 Gs of non-operating shock from the elastic deformation property of the material. The shock absorption of this class of elastic or rubber materials is very limited compared to what is required to address non-operating shocks reaching a level of 7,000 Gs. This patent does not suggest nor anticipate viscous means as an essential part to protect a disk drive from shock or vibration.

U.S. Pat. No. 3,384,221 to Houtman claims the invention of adding a plurality of fingers or cuts in foam padding used for shock protection. A package can be dropped from a maximum height of 76.2 cm (30 inches). Transmitted shock may be to 11 Gs. However, this patent neither suggests nor discloses the use of any viscous liquid for shock or vibration damping.

Additional prior art includes U.S. Pat. No. 6,347,411 to Darling; U.S. Pat. No. 6,339,532 to Boulay et al.; U.S. Pat. No. 6,039,299 to Ohnishi et al.; U.S. Pat. No. 5,995,365 to Broder et al.; U.S. Pat. No. 5,965,249 to Sutton et al.; and U.S. Pat. No. 5,510,954 to Wyler. These patents mention the use of viscous materials. However, they do not anticipate the methods and apparatus used in the present invention.

U.S. Pat. No. 6,347,411 to Darling discloses the use of viscous liquids and micro-balloons but does not present an interaction between a viscous liquid and an elastic, self-forming structure. Viscous liquid is used to dissipate energy within a closed cell material that entraps the liquid. The viscosity of the liquid is specified between 100,000 centistokes (cs) and 2,000,000 centistokes (cs). These very high viscosity fluids are characterized as solids that exhibit cold flow or creep. Various testing measures the characteristics of materials that cold flow or creep at low rates. The viscous fluids are encapsulated and entrapped within a cell to provide dissipation of shock energy at the microscopic and molecular level of the viscous fluid. In contrast, the present invention provides for dissipation of energy at the macroscopic level where liquid flows between cells of an internal structure and inside of an external membrane.

U.S. Pat. No. 6,339,532 to Boulay et al. discloses mounting a disk drive by a layer of viscoelastic material, such as double-sided foam tape, between the drive and an enclosure. Primary and secondary mounting plates may employ the viscoelastic material between them, and these plates should have aligned ventilation holes for cooling. This mounting controls internally and externally developed vibration relative to a disk drive but does not extend the performance capabilities to protect it from operating or non-operating shock. The viscoelastic material, sandwiched between two plates, dampens vibrations that may otherwise affect recording device performance or cause tracking errors. However, Boulay does not suggest the use of a viscous liquid for damping. Rather, a viscoelastic material in the form of a foam pad damps operational vibration but does not protect from shock. Further, the protective mounting primarily is effective during operation, when the device is mounted into an enclosure. Thus, Boulay does not envision protection of a device outside of the enclosure.

U.S. Pat. No. 6,039,299 to Ohnishi, et al. discloses a viscous damper for a disk-reproducing unit. The damper consists of a viscous fluid and two elastic cavities connected by a tube to a protuberant cavity. Damping occurs due to shear forces at irregular formations of both surfaces of the cavities and involves flow through the single orifice of the connecting tube. This technology is applied to a disk-reproducing unit that is always found in a manufacturing area. As such, it is not subject to the shock danger encountered by a portable device. This patent is readily distinguished from the present invention in that it does not suggest the use of an open celled material or a structure providing a multitude of orifices.

U.S. Pat. No. 5,995,365 to Broder, et al. teaches the use of flexible cables to reduce the transfer of shock forces among electronic components such as a motherboard and a hard drive-carrier assembly. The Broder patent also teaches a method of using articulated arms as shock absorbers. This teaching does not suggest an encapsulated viscous liquid that transfers to and from elastic open cells to dissipate shock and vibration. The energy dissipation is at a molecular level and not at a macroscopic level as envisioned in the present invention.

U.S. Pat. No. 5,965,249 to Sutton, et al. teaches a cold flowing material with high internal cohesion forces. This technology employs entrapment rather than flow of fluid between cells of porous material. Molecular level dissipation within the fluid produces damping. Cold flowing material produces only small displacements on a microscopic scale. It is unlikely that such materials can absorb shocks up 7,000 Gs.

U.S. Pat. No. 5,510,954 to Wyler teaches acoustic shielding. A key element is a fluid impervious barrier layer located next to sound absorptive porous foam. No liquid is located within the cells of the porous foam. A pouch contains liquid, but this liquid is separated from the foam layers by an impervious membrane of the pouch. The acoustic shielding employs no viscous liquid or porous elastic structure.

Various other patents show background art. U.S. Pat. No. 5,546,250 to Diel uses an elastomer seal to cover the frame of a drive and absorb external loads applied to the edges of the housing. The protection system is applied to a disk drive perimeter rather than to a module. U.S. Pat. No. 4,891,734 to More et al. shows the use of an elastomer body to encapsulate an electronic assembly that is confined in a closed cavity of a structure subject to vibration and shock. U.S. Pat. No. 5,216,582 to Russell et al. describes a housing assembly that forms a fixed disk drive module for a low profile fixed disk drive that is shock-mounted therein. Both More and Russell use elastomer supports to protect from shock and vibration.

As an example of the available technology in a current commercial product, the Maxtor XT 5000 external hard drive uses two plastic structures which cover four corners and two long edges of the case. The Maxtor 5000XT manual warns not to bump, jar, or drop the drive. The Maxtor specification for this drive is 250 G for linear shock.

Other literature references provide pertinent background. In a pioneering work, *Dynamics of Package Cushioning*, R. D. Mindlin describes the dynamics of package cushioning in terms of mathematical formulations. C. W. Radcliffe applies a viscous fluid damper to problems of prosthesis in *Biomechanical Design of a Lower-Extremity Prosthesis*. Specifically, a vane or a piston is used to move a viscous liquid from one chamber to another through a carefully designed orifice to effect a desired performance characteristic for a prosthetic knee mechanism.

Various commercial devices employ viscous liquids. For example, automobile shock absorbers operate with viscous liquids. Many industries use similar devices. They all have in common rigid chambers and orifices to hold the viscous fluid and control its flow.

Still other literature references show the importance of shock and vibration protection in the disk drive industry. See, for example, Stevens, L. D. et al: *Magnetic Recording Technology*; Chen and Kumano: *The Efficacy of Mechanical Damper in Actuators for Rotating Memory Devices*; Lilley, D. T.: *The Discussion of Some Engineering Trade-offs in Winchester Disk Drive Isolation and Shock Protection*; and *The Effects of Shock & Vibration on Rigid Disk Drives*, by ATASI Corporation.

The above prior art analysis contrasts the essential or often occurring elements of certain embodiments of the present innovation. The present invention comprises additional embodiments that may or may not include all the elements listed above. All observations provided herein are directed to optional aspects of the present invention and are in no way expressions of limitations to the full scope of the present invention.

Portable Data Storage—A minimum requirement for portability of disk drives is the ability to survive multiple drops from a height of 91.44 cm (36 inches)s onto a hard surface without damage to the drive. The current commercial market demonstrates difficulty in meeting this standard. DataZone Corporation is the only known supplier of a commercially available hard disk drive cartridge that has met this specification. The successful product uses a foam enclosure inside of a shock resistant housing. However, even this product suggests a difficulty. Whenever possible, a manufacturer conforms its product to a known form factor. The size of the DataZone cartridge housing is a little larger than that of the popular 3.5-inch form factor hard disk drive. Little, if any, protection against external shock is provided to a 3.5-inch form factor hard disk drive by using the DataZone module. The product is limited to the use of 3.0-inch form factor and smaller form factor hard disk drives.

Removable media can meet the minimum shock requirement for portability. Iomega, SyQuest and Castlewood have shipped hard disk drive devices using removable media. The hard disk is contained in a cartridge that is removable from the drive. This makes for data portability. The inherent problem with removable media for hard disk drives is that the media becomes contaminated and this contamination transfers to the transducer in the drive. To counter the effects of the contamination, the recording capacity of the media is relatively decreased and the reliability of the overall system is compromised.

Floppy disk, CD, and DVD are other removable media. These media are much less susceptible to contamination. However, the capacity of the recording media is 0.01% to 1.0% of the capacity of a comparable size hard disk drive. These low capacities limit the application and usefulness of the removable media disk drives. In addition, the large numbers of floppy disks, CDs, and DVDs, which are often needed and used, require a large and carefully cataloged library. This same information is better stored on a single hard disk drive that has electronic means for cataloging.

There is a need for a disk drive module that can withstand high G-shock and meet vibration specifications for commercial and personal use. These specifications define levels of shock and vibration that the device must safely and reliably withstand at a minimum.

Shipments of Disk Drives—There are design standards for common carrier shipments based upon size and weight of a container and whether the package is shipped on or off a pallet. Special shipping containers have to be designed to protect all shipments of disk drives. A percentage of common carrier shipments experience shocks in excess of the design standards, resulting in costly damage and possible loss of data. Individual disk drives are shipped in expensive and bulky boxes lined with foam or other bulky, shock absorbing, paper based material.

Environmental concerns and new laws require recycling of packing materials. Foam and other polymeric materials are extremely difficult to recycle. Secondary shipment costs of these packaging materials are high because they have to be used in large volumes for adequate protection of delicate peripherals or instruments.

There is a need for a disk drive module that can withstand high G-shock for shipment by common carriers, eliminating the need for the design of special and expensive shipping containers.

Disk Drive Mounting—Whether the hard disk drive is mounted as a single component in a system or as an array of many disk drives, the mounting design is crucial to obtaining optimum performance and enhanced reliability. Previous mounting schemes use foams, polymeric materials, viscoelastic materials, mechanical springs or a combination of these materials and devices to provide the required shock and vibration damping to the disk drive.

These previous mounting schemes either mount the drive to a solid member of a case that incorporates shock and vibration damping material or mount the drive in a cartridge or some type of module having shock and vibration isolation and damping. The cartridge or module is then attached to a solid member of the case, with or without damping materials.

The design requirements for these mounting schemes are becoming more critical because:

1) Disk drive rotational speeds are increasing. Typical rotational speeds for hard disk drives have increased from 5400 rpm to 7200 rpm, with some drives now rotating at 10,000 rpm and 15,000 rpm. Slight imbalances will result in large vibrations and/or large forces that will accelerate component wear and induce damage to the drive(s).

2) Larger dense arrays of disk drives require smaller individual contributions in vibration forces from each individual drive. The drives are all rotating at the same speed. Thus, the probability of exciting natural vibration frequencies between the elements of the array is high.

Building of systems incorporating hard disk drives requires careful handling of each and every hard disk drive. Currently, during the process of removal from the shipping container and installation into a system or system module, there is no significant protection afforded to the hard disk drive. Typically, this operation is done by unskilled labor, worldwide. The largest numbers of hard disk drive failures happen during this installation process.

There is a need for a disk drive module that can both protect the hard disk drive during system assembly and meet the vibration and shock requirements. This is irrespective of whether the system uses a single hard disk drive or an array of disk drives.

Commonality of Form Factor—The high volume production growth in the disk drive industry is supported by common form factors.

There are well-defined and worldwide acceptances of 3.5-inch, 3.0-inch, 2.5-inch, 1.8-inch, and 1.0-inch form factors. However, there is no accepted form factor for a hard disk drive module. Besides the DataZone ruggedized module form factor, there are other, un-ruggedized modules of different dimensions being offered by many companies. These modules are not interchangeable for numerous reasons, size being one of them.

At some point in time, a form factor for hard disk drive modules will be defined such that increased module manufacturing will lead to higher volumes and reduced costs. At this time, the maximum protection for shock and vibration within this fixed form factor will be a competitive advantage. The smallest form factor module of the present invention provides high G-shock protection to the 3.5-inch form factor hard disk drive, which is the largest form factor in high volume production.

To achieve the foregoing and other objects and in accordance with the purpose of the present invention, as embodied and broadly described herein, the method and apparatus of this invention may comprise the following.

SUMMARY OF INVENTION

Against the described background, it is therefore a general object of the invention to provide improved protection from shock and vibration for electronic devices, especially disk drives and other data storage devices, which may by portable or fixed.

Another object is to create a ruggedized data storage subsystem, preferably enabling the use of common form factors.

According to the invention, an energy dissipative element is used for protecting a hosted device from deleterious effects of mechanical shocks and vibrations. The energy dissipative element has a closed envelope formed of an elastic, resilient wall that encloses an internal volume. A porous body of elastic material is contained within the internal volume of the closed envelope. The porous body defines a network of cells interconnected through cell orifices suitably configured for passing viscous liquid between cells. A viscous liquid is contained within the envelope and fills at least a portion of the network of interconnected cells. As a result, under compression or expansion of the porous body, the viscous liquid flows through the cell orifices and thereby dissipates energy resulting from an external force applied against the elastic wall. A compressible gas also occupies a portion of the internal volume of the envelope.

The closed envelope can be made of latex rubber, such as from latex rubber tubing. The opposite ends of the tube are sealed to create the closed envelope. A suitable seal can be chosen from a bonded seal, an adhesive seal, a compression seal, and any combination of these. A bonded seal can be achieved by vulcanizing the latex rubber at the ends of a tube. An adhesive seal can be achieved by gluing shut the end of a tube. Adhesives such as super glue are suitable. A mechanical or compression seal can be achieved by applying a band of heat shrink material to a tube end, compressing shut the end of the tube.

The porous body can be open cell foam that defines a network of cell orifices with relatively small apertures between juxtaposed cells. Substantial portions of the cell orifices are relatively smaller in transverse dimension than the cells interconnected by them so that the viscous liquid is restrained during movement between cells. A preferred viscous liquid is polydimethylsiloxane (PDMS). Suitable viscosity is less than 20,000 centistokes (cs). The preferred viscosity is about 10,000 centistokes (cs) or as low as about 500 centistokes (cs).

According to another aspect of the invention, a host module assembly protects a hosted device from shock and vibration. The assembly includes a case, housing, or container suitably configured to receive a hosted device therein and to receive at least one mechanical energy dissipative element between the hosted device and the case. A hosted device is located within the case. Also, at least one mechanical energy dissipative element is located between the hosted device and the case. The mechanical energy dissipative element is formed of a closed envelope having an elastic, resilient wall that defines an enclosed internal volume. A porous body of elastic material is contained within the internal volume of the closed envelope. The porous body defines a network of cells interconnected through cell orifices suitably configured for passing viscous liquid between cells. A viscous liquid is contained within the envelope, filling at least a portion of the network of interconnected cells. Under compression or expansion of the porous body, the viscous liquid flows through the cell orifices and thereby dissipates energy resulting from an external force applied against the elastic wall. A compressible gas also occupies a portion of the internal volume of the envelope.

The hosted device can be a disk drive with a traditionally shaped, box-like housing having six faces. The case is suitably sized to receive at least one mechanical energy dissipative element between each of the six faces and the case. Correspondingly, at least six of the mechanical energy dissipative elements are located between the disk drive housing and the case, with at least one between each face of the disk drive housing and the case.

The case is configured with at least one external corner. A bumper formed of elastomer material is attached over the corner. A preferred elastomer material for the bumper is of 60 dm to 70 dm.

In a specifically desirable version of the invention, the hosted device is a disk drive and the case is a common form factor envelope. The resulting structure provides a ruggedized disk drive module. The disk drive can be selected from 3.5-inch, 3.0-inch, 2.5-inch, or 1.0-inch form factor disk drives. The case can be adapted for mounting into a computer system, with the result that the mechanical energy dissipative element provides the protection from shock and vibration during the installation of the disk drive module into a computer system. Either a single disk drive cartridge or a plurality can be mounted into a computer system. The mechanical energy dissipative element is functional to protect against shock and vibration during the installation of a plurality of the disk drive modules into a dense array of disk drives in a computer system. The case also may be a container used in handling a disk drive during manufacture or installation, protecting the disk drive from shock and vibration during handling.

The hosted device can be a portable electronics device. Suitable examples are a personal digital assistant (PDA), camera, camcorder, or liquid crystal diode panel.

Another aspect of the invention is a method of dissipating energy released due to external forces that cause deleterious mechanical shocks and vibrations to a disk drive. Placing a plurality of closed elastic envelopes around the disk drive carries out the method. Open cell material is provided within each of the envelopes. The open cell material has orifices communicating at least some of the cells with each other. At least some of the cells are filled with a viscous liquid material. In response to an external mechanical force applied on the elastic envelope, the envelope deforms. It forces the viscous liquid through the orifices from one cell to another. This dissipates energy from the external mechanical force.

The method may include further steps of returning the elastic envelope essentially to its original shape due to the energy stored in the envelope as a result of its deformation. This also returns the viscous liquid through the orifices from one cell to another by forces generated within the viscous liquid. The accompanying drawings, which are incorporated in and form a part of the specification, illustrate preferred embodiments of the present invention, and together with the description, serve to explain the principles of the invention. In the drawings:

DETAILED DESCRIPTION

Figure 1:
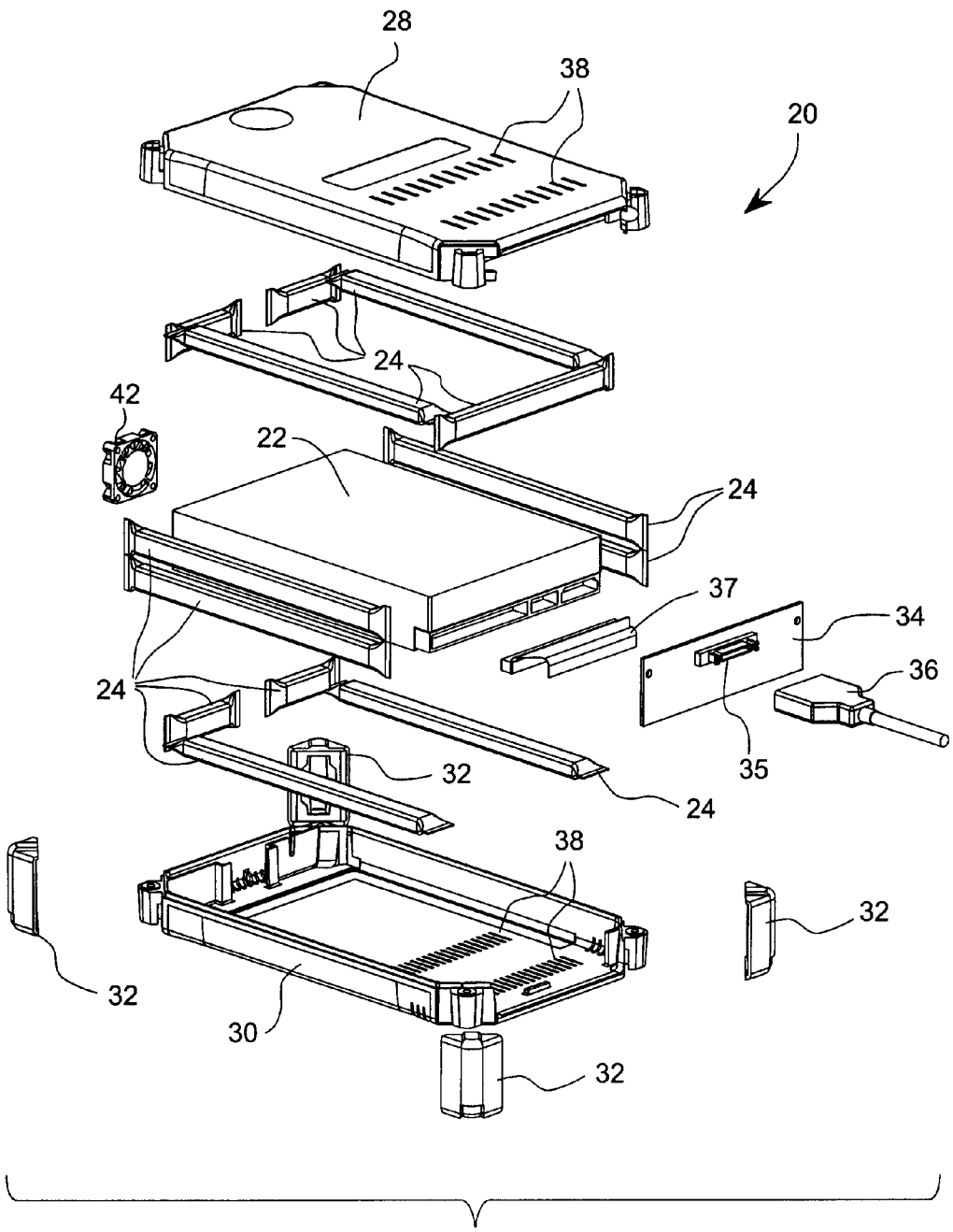
FIG. 1 is an exploded isometric view of a portable host module assembly employing mechanical energy-dissipative elements, including optional features.

The invention is a mechanical energy-dissipative element (MEDE) that is useful in protecting a hosted device from many types of mechanical shock and vibration. The energy-dissipating element is well suited for use in a portable host module for a hosted device. For example, a fixed disk drive or a removable disk drive are typical hosted devices that may be packaged in a portable housing or casing to create a removable drive module. The MEDE can be used between the hosted device and the housing or casing to protect the hosted device. In this application, the MEDE enables an expanded range of products to be offered in standard form factors, in which the hosted device must be compactly packaged to fit within dimensionally specified limits.

Protection is possible from shock or vibration in many modes. The energy-dissipating element can protect by reducing external impact shock such as from falls or dropping, by attenuating internal self-exciting vibration forces, by attenuating acoustic energy emanating from the hosted device, or by increasing conductive thermal transport from the hosted device. Particularly when the hosted device is a disk drive, it is a significant advantage that a damping structure operates effectively when placed between a disk drive and an encasing module to attenuate internal self-exciting vibration forces emanating from a disk drive. Thus, terms such as shock and vibration refer to end results that may be initiated from any source or cause, including the hosted device, itself, or external events.

Hosted devices are not limited to disk drives. Numerous portable electronics devices may beneficially serve as hosted devices. Common examples include personal digital assistants (PDAs), cameras, camcorders, and liquid crystal diode (LCD) panels. Further, hosted devices need not be portable. Fixed disk drives and other sensitive devices can benefit from protection even when mounted in large or stationary racks, cabinets, cases, and housings. A particularly pertinent example is a collection of similar fixed disk drives as often assembled in a RAID array. However, many types of equipment and devices can benefit by damping inter-equipment effects, whether the devices are of the same type or different types.

Further, the hosted device need not be in operation or in a functional individual or group mounting. Protection also is necessary during transportation and handling, such as when a hosted device is in a shipping container. The MEDEs also can be effective when applied between hosted devices, individually or in modules, and between hosted devices and a shipping container. Each hosted device can be protected both from other hosted devices and from the boxing or crating as may be used during bulk transportation. Also, the MEDE can protect a hosted device during other phases of handling, such as during installation.

The energy-dissipating element is a cost effective means for protecting any disk drive during shipment and installation. In an exemplary embodiment described in greater detail hereinafter, the slim module is configured to provide maximum protection for a 3.5-inch form factor hard disk drive as well as to fit into a bay or docking device that occupies a 13.34 cm (5.25 inch) slot within a personal computer (PC). In addition, the module provides vibration damping by viscous means. This permits use of drives with very high rotation speeds in system arrays, which typically generate an increased level of vibration. The same module utilizing a 2.5-inch form factor drive will withstand shock greater than 7,000 Gs. Viscous damping gives better protection than that obtained by using a single or a combination of foam pads. Additionally, viscous properties of the material provide improved heat transfer and acoustic damping.

The exemplary embodiment is a module consisting of a 3.5-inch form factor hard disk drive and a set of viscous damping devices placed between the hard disk drive and a case made from shock resistant plastic. This module protects the hard disk drive from shocks applied in all 6 axes (3 of translation and 3 of rotation). The internal hard disk drive signal and power connections are applied using a flex PCA cable, flat cable and printed circuit board assembly (PCBA) located at one end of the module. PCBA output can be connected to various kinds of external interface cables or to a bay or docking device. Power to the stand-alone module is applied via a mini-DIN connector mounted on to the internal PCBA.

The dimensions of a 3.5-inch form factor hard disk drive module are 35 mm×115 mm×190 mm (1.38 in×4.53 in×7.54 in). This is slightly larger in size than the commercially available DataZone 2.5-inch ruggedized module, but it can slide into the selected bay or docking device.

The present invention provides a method and a system that dampens mechanical shock and vibration by means of a mechanical energy dissipative element (MEDE). Each MEDE consists of numerous interconnected cells containing a viscous liquid and often a header of compressible gas. A matrix of such interconnected cells may be provided in open cell elastic foam. A membrane, such as a membrane of foam material, defines each cell, and many of the cells house a pocket of viscous liquid. The vast majority of these cells have at least one aperture through which the viscous liquid can enter or exit the cell and flow from one cell to a juxtaposed cell. Each aperture is significantly smaller in transverse dimension or cross section than the cells it interconnects. A relatively small aperture, as compared to the dimension of the cells, is desirable so that the aperture provides a restriction against liquid transit to or from the cell. The open cell foam, viscous liquid, and compressible gas header are contained in a sealed elastic housing that has shape memory so that it tends to return to a standard configuration.

A preferred open cell foam is a urethane foam supplied by E-A-R Specialty Composites of Indianapolis, Ind. Foams sold under the trademark Confor, and especially Confor CF-EG, are suitable. Several foams in this product line are differentiated by densities and stiffness. An especially preferred foam is known as CF-45 Blue, which has a medium density of 5.8 pcf. Other foams in the CF series are CF-40 Yellow, CF-42 Pink, and CF-47 Green. The latter is of higher density than CF-45 Blue and offers good potential for use in this invention. Confor foams are known for use as shock absorbing pads in disk drives and can dissipate up to 97 percent of shock energy without recoiling and amplifying the effect. In hard disk drives, the foam alone can help protect against handling-related damage. Confor foam formulations, including CF-EG foams, are engineered to compress and conform under sustained pressure and to slowly rebound when the weight is released. When the foams receive a direct impact, they behave like semi-rigid foams, resist collapse and absorb the impact internally.

When mechanical forces, such as those caused by shock, vibration and acoustic waves, act to compress portions of an essentially open celled MEDE, the mechanical energy is dissipated by generation of forces that simultaneously drive pockets of viscous liquid through the apertures of the cells. After the period of compression of the MEDE by an external force has ended, the MEDE regains its original shape due to elastic nature of the housing and of the open cell material and due to capillary action. The expansion of the compressed cells and the elastic envelope will continue until the viscous liquid returns to established equilibrium state.

In many applications of the present invention, the MEDE comprises the following essential elements: an elastic structure having a plurality of open cells; viscous liquid distributed within the open cells; compressible gas, and an envelope enclosing these elements.

The viscous liquid dissipates the energy of a mechanical shock due to highly frictional shear forces within the liquid and between the liquid and cell walls as the liquid passes through narrower channels leading between the individual open cells and between cells and the interior of the envelope. The liquid flow can be observed on a macroscopic level. The liquid and cells thereby provide a means to absorb and redirect undesirable mechanical energy that might otherwise damage or affect a hosted device in absence of such a means.

The envelope comprises of an elastic material that: (a) helps the material within the MEDE to redistribute the viscous liquid and air into the open cells after a mechanical shock has dissipated, and (b) permits the MEDE to regain its original shape. The elastic envelope material may provide additional shock absorption by acting like a spring deformed by an external mechanical force to store and subsequently release the energy.

The fluids contained within the envelope are both a gas and a liquid. Air is a suitable gaseous fluid of very low viscosity. A preferred open cell foam is a polyurethane foam. Such foams are known to have some internal damping at the molecular level of the gas but none at a macroscopic scale as envisioned in the present invention. The present invention teaches the use of a highly viscous liquid flowing from one cell to another of the open cell foam or equivalent material and to and from the preferred embodiment with an elastic membrane enclosure of the MEDE. The envelope may be composed of latex tubing.

With reference to the drawings, FIG. 1 shows a portable module assembly 20 in an exploded view. Main components include a hosted element 22 which may be a disk drive or other shock sensitive component. A plurality of MEDEs 24 surround the hosted element. A typical hosted device 22 has a block-like shape with six housing faces: a top, bottom, and four sides. The top and bottom are major faces, two relatively longer sides are intermediate faces, and two relatively shorter sides are minor faces. For protecting a hosted element configured similarly to a typical fixed disk drive as shown in FIG. 1, MEDEs are configured in appropriate lengths for the shape of the hosted device and to accommodate the hosted device's cooling needs. A set of five MEDEs 24 protect the top of the hosted device, arranged around the top perimeter. A set of two MEDEs is located on each longer side of the hosted device, and four MEDEs protect bottom of the hosted device. In the illustrated configuration, the topside MEDEs include a MEDE across the front edge of the top, while the bottom side MEDEs do not cover the front edge because an air flow inlet is located at that position.

Figure 2:
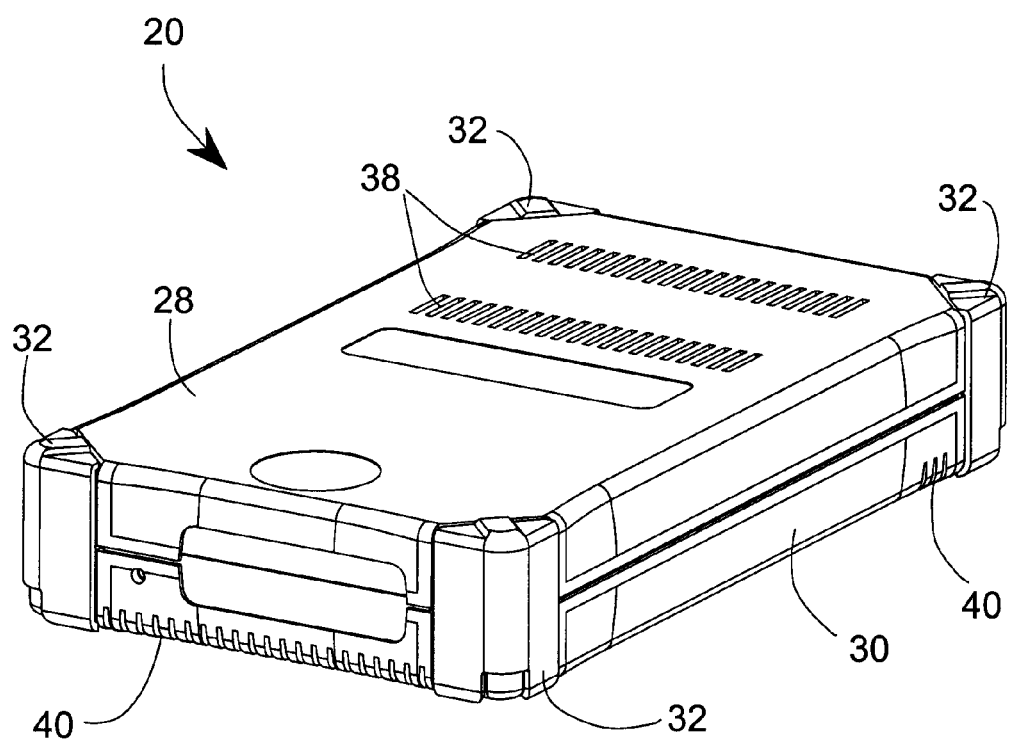
FIG. 2 is an isometric view taken from the front upper right side of the assembled module of FIG. 1.
Figure 3:
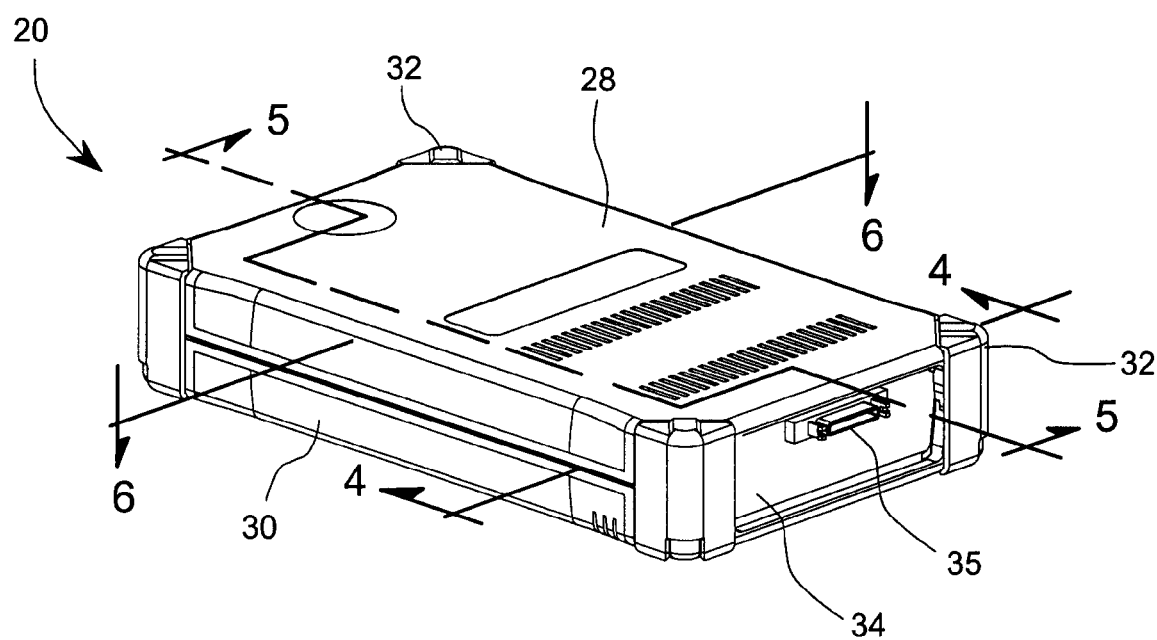
FIG. 3 is an isometric view taken from the rear left side of the assembled module of FIG. 1.

The module 20 provides a case 26, FIGS. 2 and 3, which receives the hosted device. The MEDEs are mounted inside the case. A top or cover 28 and a bottom or base 30 mate to surround the hosted device 22. The various MEDEs 24 are attached to the juxtaposed portions of the case 26 by any suitable fastening means, which conveniently may be double-sided sticky tape or other adhesive.

Optional corner bumpers 32 provide additional shock and vibration protection for the hosted device. In FIG. 1, four corner bumpers 32 are attached respectively to the four outside corners of case 26. Each bumper 32 preferably is formed of an elastomer, and an elastomer material of sixty to seventy dm is preferred. The four corners of the case also serve as a suitable location for fastening the case together with suitable fasteners such as screws. The bumpers 32 may cover the four fastener locations. The bumpers can be molded or transfer molded with rubber compounds using well-known processes. The bumpers 32 are applied to the case 26 after cover 28 and the base 30 are assembled to form the completed case 26. Because bumpers 32 are located at the corners of module case 26, the bumpers are highly likely to encounter first in contact with an impacting surface when the module is dropped. The bumpers 32 reduce the transmitted shock to the case 26 and in turn reduce the transmitted shock to the hosted device 22. The bumpers 32 form a permanent part of module 20 and provide a protective function during handling and installation. The bumpers provide multi-axis shock protection.

Other optional components of the module 20 are a circuit board 34 with a cable interface 35, an internal flex cable 37 between the circuit board and the hosted device, and an external cable 36 configured to engage the cable interface of the circuit board 34. The board 34 typically transmits I/O signals from the hosted device, and cable 36 conveys signals to and from a computer. These optional components typically are used when the hosted device is a hard disk drive. Other optional elements may be selected and adapted for use as required for the needs of different hosted devices.

The MEDEs 24 in the illustrated configuration support the mass of a 2.54 cm (1-inch) high hard disk drive. The case size for a 3.5-inch form factor hard disk drive is 35 mm×115 mm×190 mm (1.38 in×4.53 in×7.54 in). The case 26 beneficially can be made from impact resistant plastic having properties similar to Cycoloy brand plastic, sold by General Electric Plastics as item C2950. Cycoloy is an ABS plus polycarbonate plastic, unfilled, injection grade. It has 40% elongation at break, Izod impact strength of 9.93 ft-lb/in, and is coated with a conductive film on the inside for RFI shielding.

Figure 4:
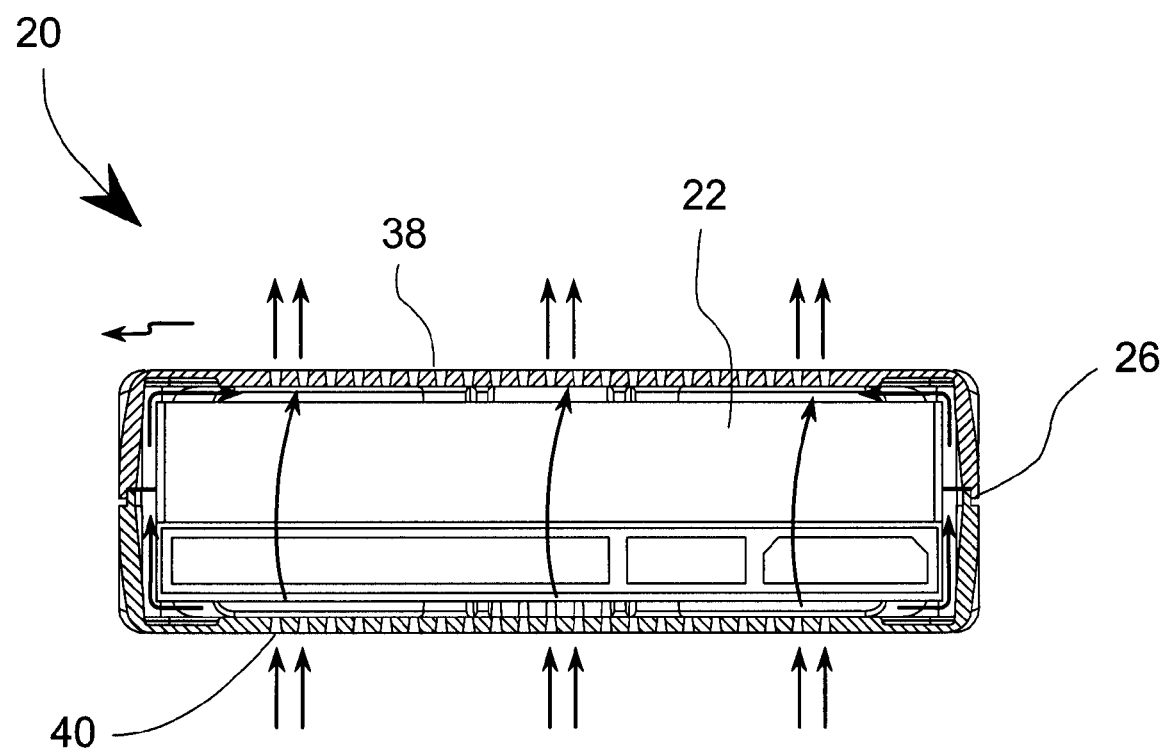
FIG. 4 is a transverse cross-section taken along a vertical plane through line 4—4 of FIG. 3, showing airflow through the module.
Figure 5:
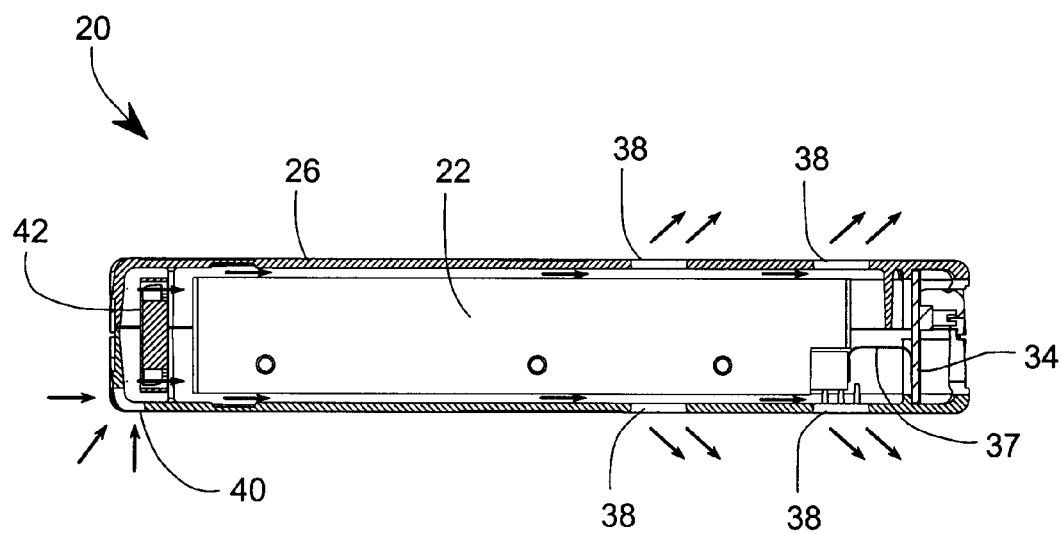
FIG. 5 is a longitudinal cross-section taken along a vertical plane through line 5—5 of FIG. 3, showing airflow through the module.
Figure 6:
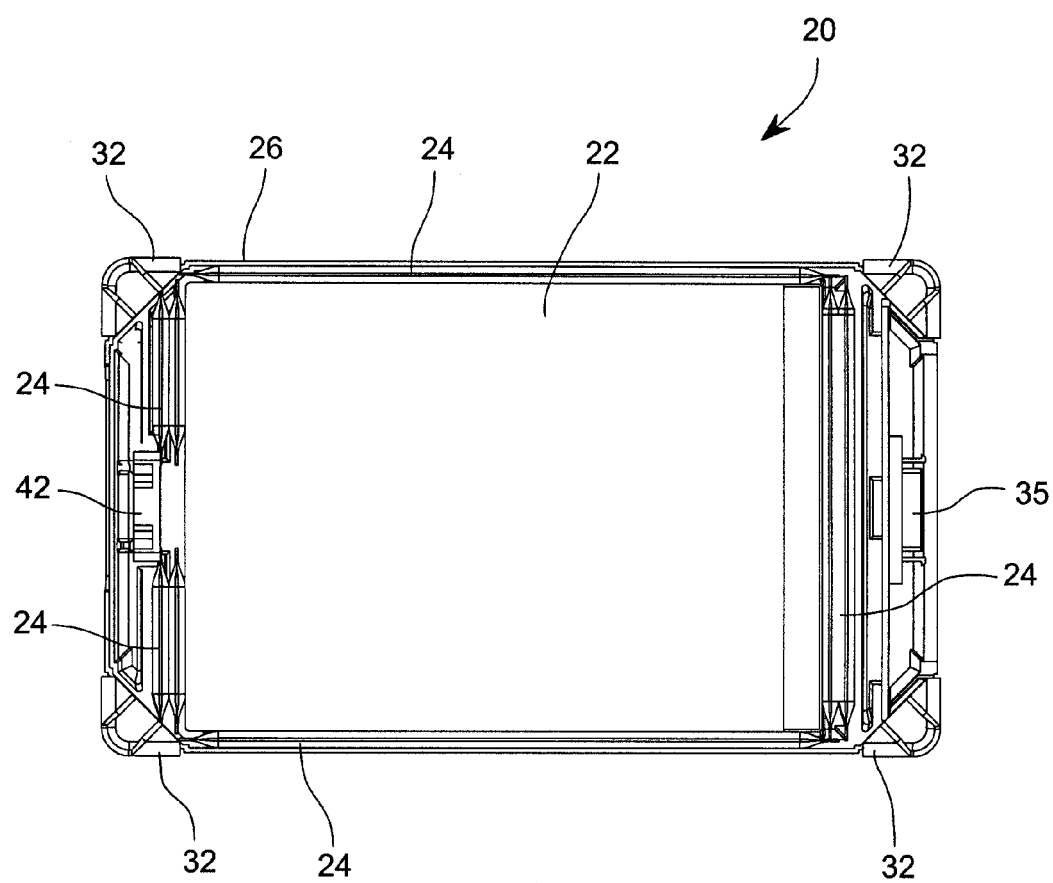
FIG. 6 is a cross-section taken along a horizontal plane through line 6—6 of FIG. 3.

A desirable case configuration includes large slots 38 formed in cover 28 and base 30. Additional, possibly smaller slots 40 may be formed in the edges of base 30 or other locations and are best shown in FIGS. 4–6, where flow arrows suggest a path of cooling air through the housing 26. All of the slots contribute to conductive and convective heat transfer, which cools the hard disk drive or other hosted device. Another optional component, a fan 42 provides forced air-cooling.

A fully assembled portable module 20, FIGS. 2 and 3, houses a hosted device and MEDEs 24 within case 26. The optional bumpers 32 are shown in position to protect the corners of module 20 and cover the corner screw locations. Arrows in FIGS. 4–6 show a convective airflow pattern for cooling the hosted element. The compact structure of the MEDEs enables this pattern when arranged as shown in FIG. 1. Notably, other types of shock protection that employ foam pads may block airflow and cause over-heating difficulties.

The portable module 20 can be used in several different environments. In the embodiment of FIG. 5, the module 20 is suited for tabletop use. Airflow indicated by the arrows in FIG. 5 show a free convection pattern. Both natural convection currents through the interior of the module assembly and conduction through the thermally conductive viscous liquid in the MEDEs dissipate internal heat from the housing 26. The optional fan 42 enables forced convection. Airflow entering the front of the case 26 and exiting at the top and bottom of the case dissipates internal heat through forced convection flow.

Figure 7:
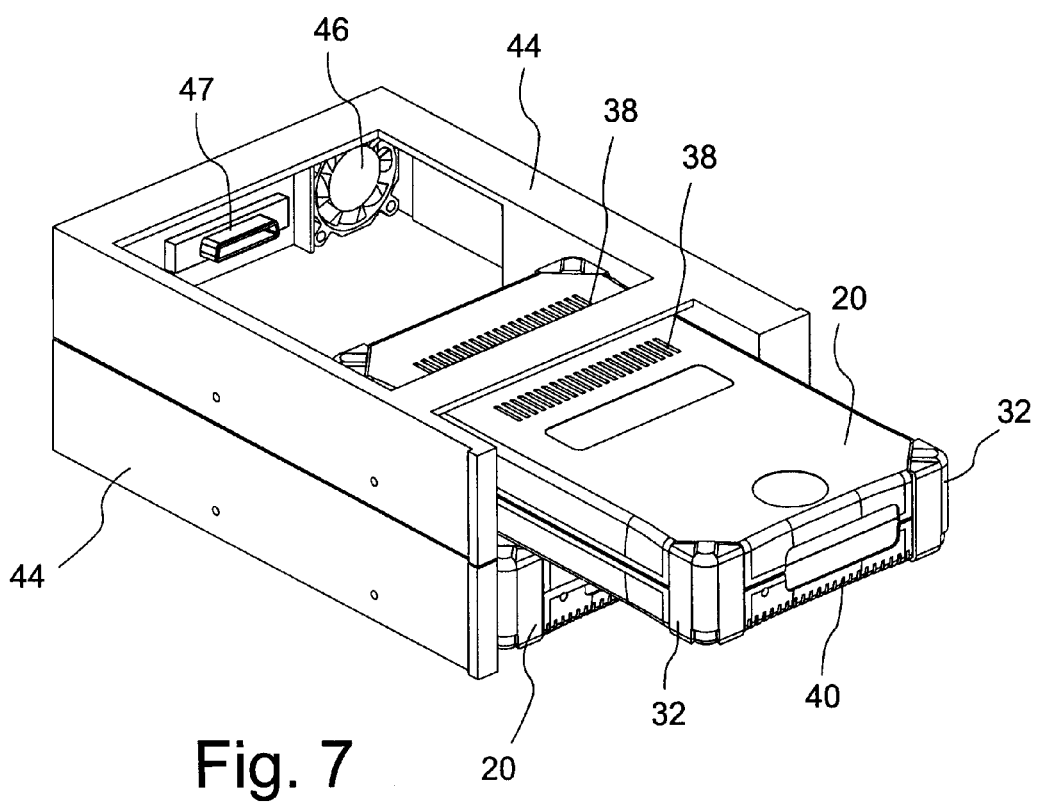
FIG. 7 is an isometric view of a first portable hosted module in ejected position within a docking device and a second portable hosted module in inserted position.
Figure 8:
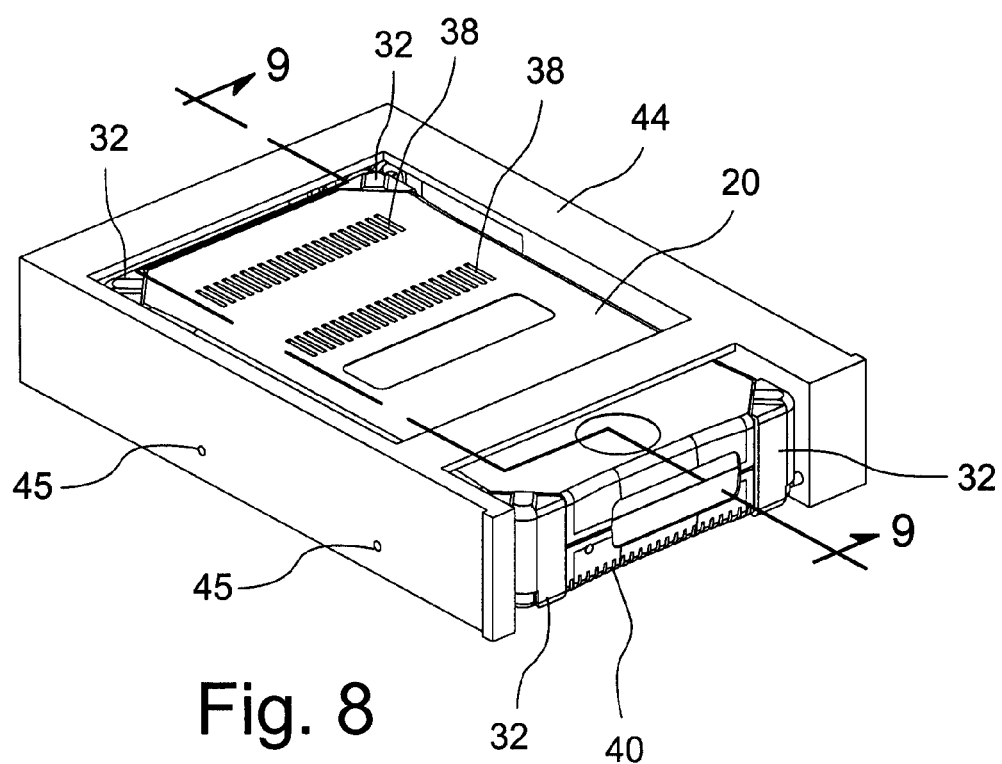
FIG. 8 is an isometric view of a portable hosted module in inserted position within a docking device.
Figure 9:
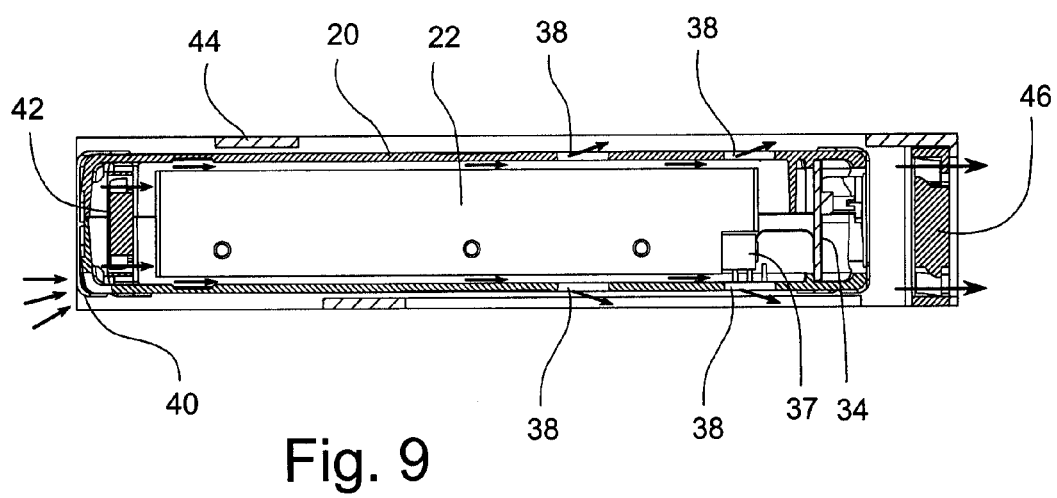
FIG. 9 is a cross-sectional view taken along a vertical plane through line 9—9 of FIG. 8.

Still other operating environments include desktop computers and rack systems. In desktop computers, disk drives are placed in 13.34 cm (5.25 inch) slots that are generally available for their installation. Many mounting systems are known, including rails and screw-in mountings. Mirroring boxes typically have two such spaces and rack-mounted or tower RAID boxes have a plurality of such spaces. A docking device 44 may occupy such a 13.34 cm (5.25 inch) slot. In FIG. 8, the screw holes 45 provide a means of mounting a docking device 44 in a standard slot. The shock-resistant case 26, which slides into the docking device 44 as shown in FIGS. 7 and 8, has the advantage of making the module 20 portable. It makes use of a Centronics or an equivalent male connector 35 located on the board 34 inside the module 20 and a corresponding mating female connector 47 on the board of docking device 44. Generally, hot swap can be achieved with such a module 20 in the docking device 44.

Still other operating environments include desktop computers and rack systems. In desktop computers, disk drives are placed in 13.34 cm (5.25 inch) slots that are generally available for their installation. Many mounting systems are known, including rails and screw-in mountings. Mirroring boxes typically have two such spaces and rack-mounted or tower RAID boxes have a plurality of such spaces. A docking device 44 may occupy such a 13.34 cm (5.25 inc)h slot. In FIG. 8, the screw holes 45 provide a means of mounting a docking device 44 is a standard slot. The shock-resistant case 26 slides into the docking device 44 as shown in FIGS. 7 and 8 has the advantage of making the module 20 portable. It makes use of Centronics or an equivalent male connector 35 located on the board 34 inside the module 20 and a corresponding mating female connector 47 on the board of docking device 44. Generally, hot swap can be achieved with such a module 20 in the docking device 44.

One of the benefits of the MEDE dampers is that they attenuate complimentary vibrations between similar devices, such as a plurality of fixed disk drives in a RAID array. A single mirroring function (RAID 1) can be implemented within a two bay box. A multiplicity of the RAID function can be implemented in an eight bay, 3U wide tower or rack-mounted 3U high chassis. RAID 0, 1, 0+1, 3 and 5 configurations are typically achieved in tower or rack-mount boxes. Generally, it takes a combination of three to eight modules 20 to achieve RAID architecture and the corresponding redundancy. The portable module 20 is ideally suited for use in RAID configurations since it is portable and capable of withstanding high levels of vibration and shock.

Figure 10:
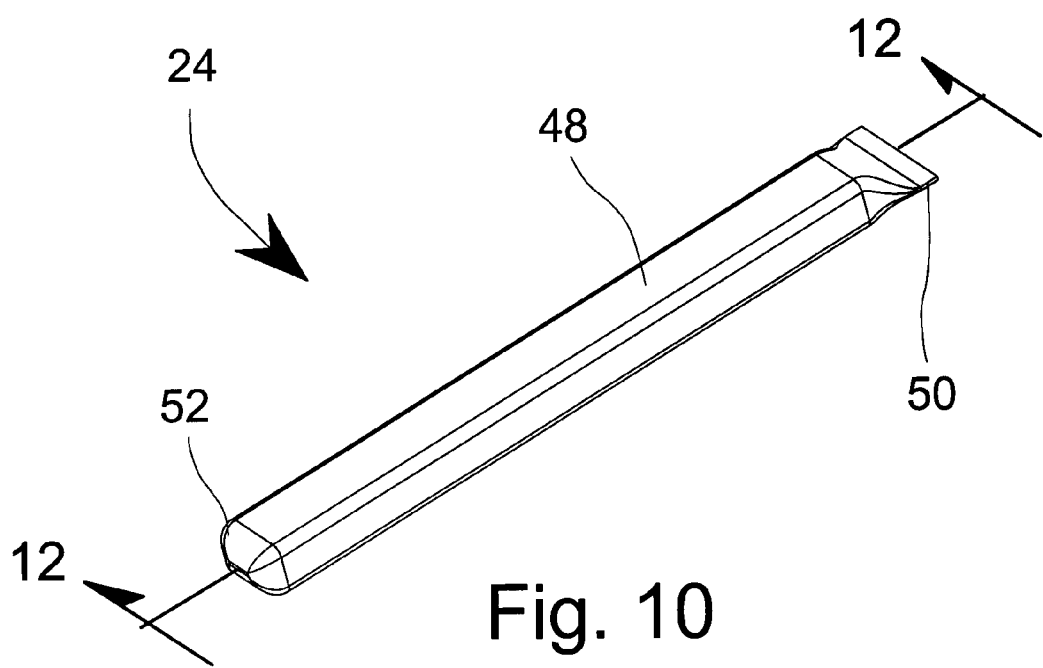
FIG. 10 is an isometric view of a mechanical energy-dissipative element in uncompressed condition.
Figure 11:
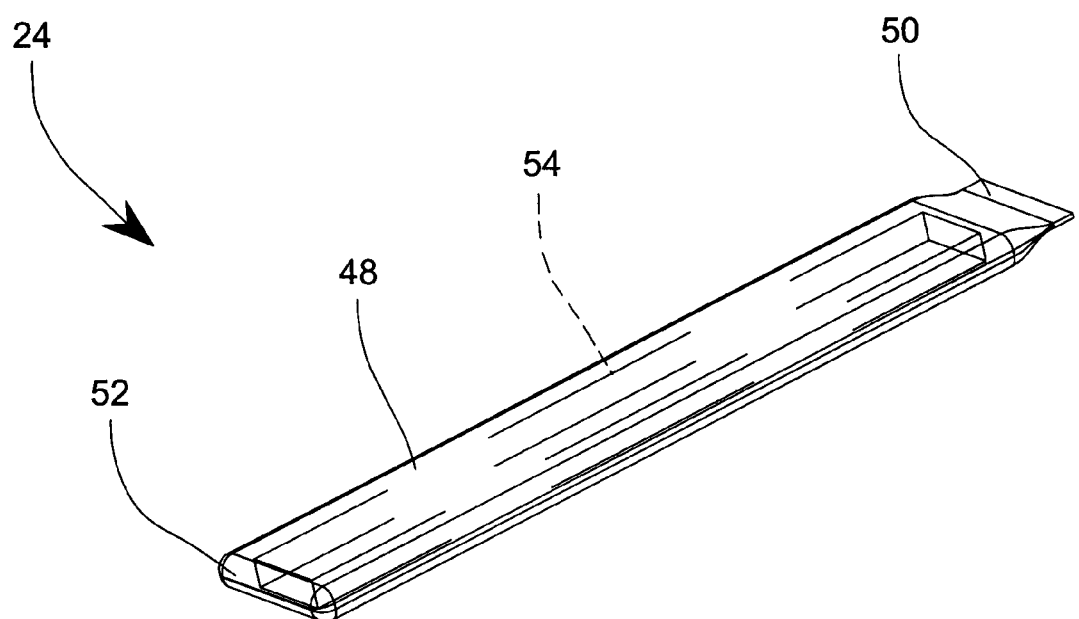
FIG. 11 is an isometric view of a mechanical energy-dissipative element in compressed condition, with a compressed open cell foam body inside an outer envelope shown in phantom.
Figure 12:
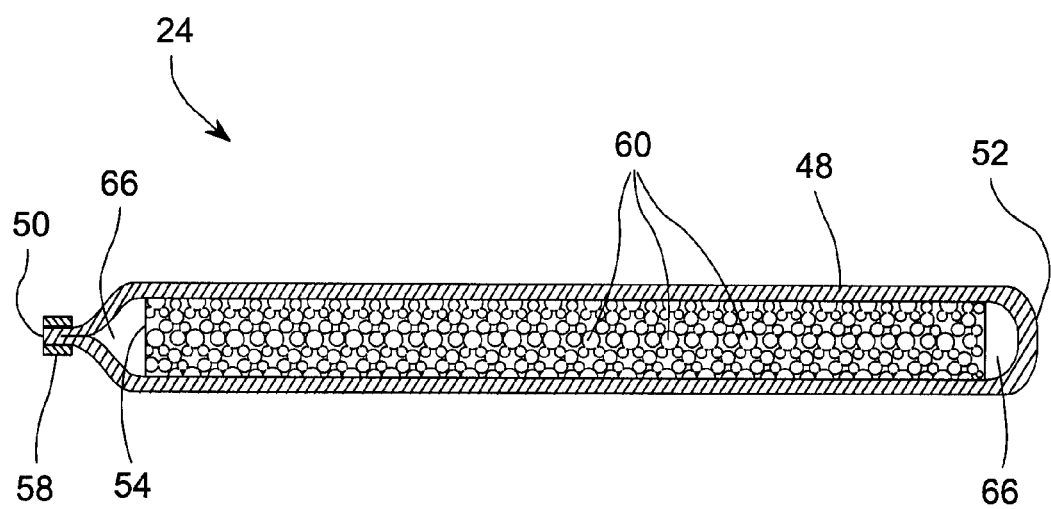
FIG. 12 is a cross-sectional view of a mechanical energy-dissipative element taken along a vertical plane through line 12—12 of FIG. 10.
Figure 13:
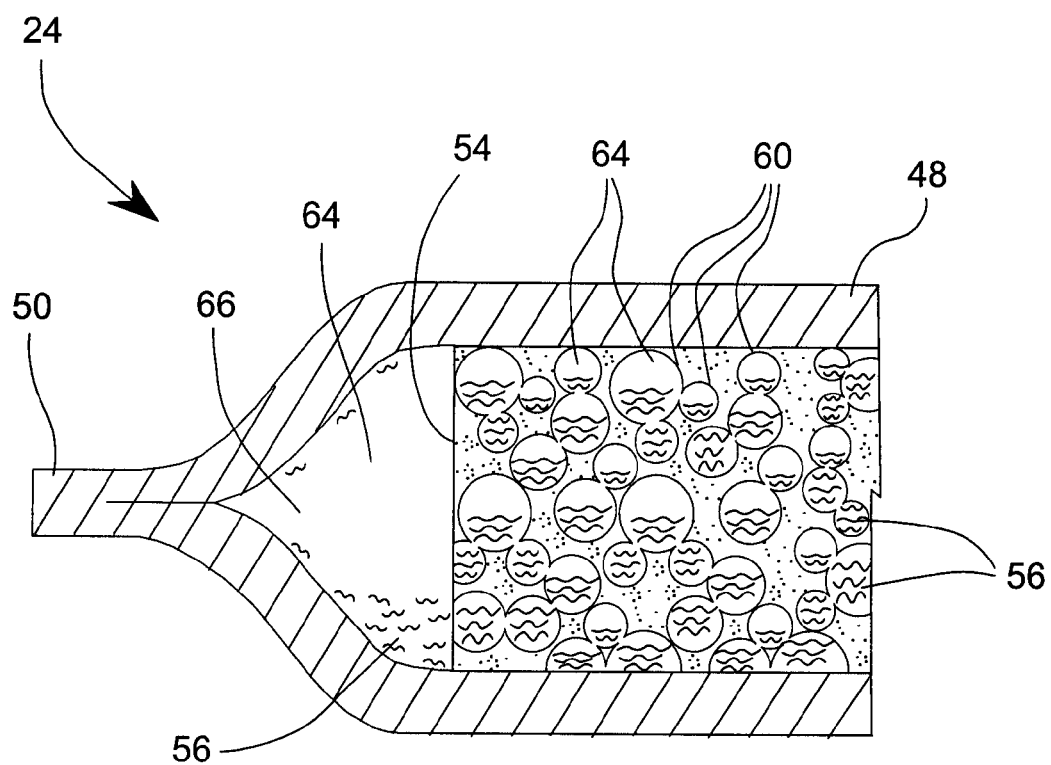
FIG. 13 is an enlarged, fragmentary view of one end of the mechanical energy-dissipative element of FIG. 12.

FIGS. 10–12 show the structure of a MEDE 24. An external skin or envelope 48 serves as a housing and contains other components of the MEDE. A highly resilient material such as latex rubber is the preferred material for forming the envelope. An especially effective and efficient shape is longitudinally elongated, resulting in a latex tube being a good choice. At least one end of a tube conveniently is open for inserting additional components into the envelope. The embodiments of FIGS. 10–12 show one end 50 that has been sealed after inserting components into the tube. The second and opposite end 52 may be identical to the first end 50. Alternatively, the second end 52 may be originally formed as a closed end, as shown in the drawings.

The envelope 48 contains a body 54 formed of elastic, resilient, open cell foam. FIG. 12 shows a matrix of interconnected cells in which the aperture between two cells tends to be of substantially smaller cross-sectional area than either of the cells, themselves. A typical aperture area may be ten percent to twenty-five percent of the cross-sectional area of an adjacent cell. Thus, the apertures provide restriction to flow of viscous liquid, although due to capillary action and positive or negative pressure the viscous liquid is flowable through the cells. The external geometry of the open cell foam 54 determines the geometry of the envelope 48. The envelope also contains viscous liquid 56, which may be dispersed throughout the envelope and the open cells of the foam 54. The amount of viscous liquid 56 within the envelope and foam inside it is controlled to fill the cells of the foam, fully or partially, so that a desired shock response is obtained. As an example, a MEDE about four inches long contains about two milliliters of 10,000 cs viscosity PDMS. Longer and shorter MEDEs, respectively, may contain proportionately more or less PDMS. The following example illustrates how the MEDEs are structured and sized in one useful embodiment.

| | | |
|---|---|---|
| 1. | Tubing: 15.24 cm (6 in) long | 4 pcs. |
| 2. | Foam: 12.7 cm (5 in) × 4.76 to 6.35 mm (0.189 to 0.25 in) | 4 pcs. |
| 3. | PDMS: 10,000 cs | 2 ml/MEDE |
| 1. | Tubing: 10.46 cm (4.12 in) long | 1 pcs. |
| 2. | Foam: 7.92 cm (3.12 in) × 4.76 to 6.35 mm (0.189 to 0.25 in) | 1 pcs. |
| 3. | PDMS: 10,000 cs | 1.65 ml/MEDE |
| 1. | Tubing: 50.8 mm (2.0 in) long | 4 pcs. |
| 2. | Foam: 25.4 mm (1.0 in) × 4.76 to 6.35 mm (0.189 to 0.25 in) | 4 pcs. |
| 3. | PDMS: 10,000 cs | 0.5 ml/MEDE |
| 1. | Tubing: 15.24 cm (6.0 in) long | 4 pcs. |
| 2. | Foam: 12.7 cm (5 in) × 3.18 to 3.81 mm (0.125 to 0.15 in) | 4 pcs. |
| 3. | PDMS: 10,000 cs | 1.33 ml/MEDE |

The gas in the preferred embodiment is air. The viscosity of PDMS was selected from a range of about 500 cs to 20,000 cs. The viscous liquid is preferred to have a viscosity of less than 20,000 cs. A single, preferred, effective viscosity for the uses described is about 10,000 cs.

FIG. 12 shows a typical MEDE using an envelope 48 of elastic material. The end 50 of the envelope is sealed to prevent any leakage. The sealing is accomplished by using vulcanizing fluid, super glue or mechanical clamping. The drawing illustrates a representative mechanical clamp or band of heat shrink tubing 58 closing end 50.

A comparison of FIGS. 10 and 11 provides a conceptual illustration of a MEDE in compressed and uncompressed configurations. In the compressed configuration of FIG. 11, the viscous fluid has been displaced either into cell areas that previously contained gas or into void areas 66 FIG. 10 shows the MEDE 24 before the shock loading. FIG. 11 shows the same MEDE under dynamic shock loading, i.e. when disk drive velocity is near zero at the end of a shock event. Both FIGS. 10 and 11 show a single sealed end 50 of the envelope, although a similar sealed end may be used at both ends of a MEDE. When the envelope is produced from a length of tube, both ends are sealed. The length and crosssection of an MEDE may be different along different sides of a hosted device or hard disk drive. In order to produce different sizes, different lengths and diameters of latex tubing may be employed.

A comparison of FIGS. 10 and 11 provide a conceptual illustration of a MEDE in compressed and uncompressed configurations. In the compressed configuration of FIG. 11, the viscous fluid has been displaced either into cell areas that previously contained gas or into void areas 66. FIG. 10 shows the MEDE 24 before the shock loading. FIG. 11 shows the same MEDE under dynamic shock loading, i.e. when disk drive velocity is near zero at the end of a shock event. Both FIGS. 10 and 11 show a single sealed end 50 of the envelope, although a similar sealed end may be used at both ends of a MEDE. When the envelope is produced from a length of tube, both ends are sealed. The length and cross-section of an MEDE may be different along different sides of a hosted device or hard disk drive. In order to produce different sizes, different lengths and diameters of latex tubing may be employed.

There are two mechanisms, both macroscopic, for dissipation and storage of mechanical energy. The flow of viscous liquid from a region of cells under compression to a region of cells under no direct load causes capillary flow through a multitude of orifices and also flow with respect to cell walls. This leads to energy dissipation. The accompanying deformation of the cell walls of the foam and that of the elastic envelope that may be stretched lead to storage of elastic energy. This energy essentially restores the MEDE 24 to its unloaded condition when the shock transient has subsided. The viscosity of the liquid and the volume of the cells are determined experimentally for reducing the shock transferred by the module case 26 to the hard disk drive or other hosted device 22 to an acceptable level as may be specified by the manufacturer.

The effectiveness of a MEDE was tested using a module 20 containing a 3.-inch form factor" Hitachi Deskstar drive model # 07N9685. The module 20 was dropped from a height of 30.48 cm (1 foot) to 1.52 m (5 feet) so that the broad side of the module impacted a linoleum-over-concrete slab. An accelerometer (model U350B23 made by PCB Pizotronics) was placed on the base of the drive thru a hole created in the case of the module. LeCroy's digitizing Oscilloscope (model DDA125) was used to record accelerometer output. The test showed that less than 120 G force was registered by the accelerometer and thus experienced by the drive. A check subsequent to this four-foot drop verified drive read back of pre-recorded data without any errors, demonstrating that read/write functionality remained intact. No known protective system in current commercial use has an ability to protect such a drive from four feet of free fall onto a linoleum surface.

The parameters considered in the design of the MEDEs for the preferred embodiment are the thickness of the latex envelope, type of foam, type of fluid, its viscosity & quantity, and type of sealing procedure. For the preferred embodiment, Flex brand super glue is used to seal the ends. However, tubing made of heat-shrink material could be slipped over the ends and heat-shrunk to seal one or both ends, exemplifying a type of mechanical sealing.

The first failure mode of a disk drive is due to head-slap caused by lift off and subsequent drop of the magnetic transducer that is suspended on a spring lever above the surface of the recording media. Head-slap damages either the magnetic transducer or the recording media. Damage to the recording media generates debris that will later result in the magnetic transducer "crashing" onto the recording media. The shock at which head-slap occurs defines the upper limit acceptable for the shock transmitted to a hosted hard disk drive 22. The arrangement and design of the MEDE 24 is critical in the axis in which the head will lift off the media because the transmitted shock has to be reduced to less than the upper limit acceptable to the hosted hard disk drive 22. The overall benefit of the MEDE 24 is to limit the deceleration experienced by the hard disk drive 22 to less than 200 G. This is the usual shock limit specification for currently available hard disk drives. Deceleration amplitudes below this limit do not result in head-slap. The length and number of the MEDEs 24 used to protect from shock in this direction are the controlling factors in the preferred embodiment design.

The second failure mode for shock to a disk drive involves the positioner for the magnetic transducer moving from the "landing area" onto the recording area of the media. Special features of the "landing area" prevent the head from sticking to the magnetic media when the disks are not spinning. The disk drive contains a latch assembly to prevent positioner motion unless the disks are spinning. With large rotational shock on the same axis as the axis of rotation for the positioner, the latch will fail. The mechanical energy dissipative elements utilizing the viscosity of the liquid are most effective for rotational shock because the transmitted shock is reduced to a lower level than possible with prior known devices.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. An energy dissipative element for use in protecting a hosted device from deleterious effects of mechanical shocks and vibrations, the energy dissipative element comprising:
   a closed envelope formed of an elastic, resilient wall and enclosing an internal volume;
   a porous body of elastic material contained within the internal volume of said closed envelope, wherein said body defines a network of cells interconnected through cell orifices suitably configured for passing viscous liquid between cells; and
   a viscous liquid contained within said envelope and filling at least a portion of said network of interconnected cells, wherein under compression or expansion of the porous body, said viscous liquid flows through said cell orifices and thereby dissipates energy resulting from an external force applied against said elastic wall; and
   a compressible gas occupying a portion of the internal volume of the envelope.

2. An energy dissipative element, as claimed in claim 1, wherein:
   said closed envelope is made of latex rubber.

3. The energy dissipative element of claim 1, wherein said closed envelope is a tubular structure and further comprises:
a sealing means closing the opposite ends of the tubular structure.

4. The energy dissipative element of claim 3, wherein said sealing means is selected from the group consisting of a bonded seal, an adhesive seal, a compression seal, and any combination thereof.

5. The energy dissipative element of claim 4, wherein said bonded seal comprises a vulcanized seal bonding shut an end of said envelope.

6. The energy dissipative element of claim 4, wherein said adhesive seal comprises super glue adhering shut an end of said envelope.

7. The energy dissipative element of claim 4, wherein said compression seal comprises a band of heat shrink tubing compressing shut an end of said envelope.

8. An energy dissipative element, as claimed in claim 1, wherein:
a substantial portion of said cell orifices are relatively smaller in transverse dimension than the cells interconnected by them.

9. An energy dissipative element, as claimed in claim 1, wherein:
said viscous liquid is polydimethylsiloxane (PDMS).

10. An energy dissipative element, as claimed in claim 9, wherein:
said polydimethylsiloxane is of a viscosity of less than 20,000 centistokes (cs).

11. An energy dissipative element, as claimed in claim 9, wherein:
said polydimethylsiloxane is of a viscosity of about 10,000 centistokes (cs).

12. An energy dissipative element, as claimed in claim 9, wherein:
said polydimethylsiloxane is of a viscosity of about 500 centistokes (cs).

13. An energy dissipative element, as claimed in claim 1, wherein:
said viscous liquid is of a viscosity of less than 20,000 centistokes (cs).

14. An energy dissipative element, as claimed in claim 9, wherein:
said viscous liquid is of a viscosity of about 10,000 centistokes (cs).

15. An energy dissipative element, as claimed in claim 9, wherein:
said viscous liquid is of a viscosity of about 500 centistokes (cs).

* * * * *